United States Patent [19]

Yamada et al.

[11] Patent Number: 4,902,537
[45] Date of Patent: Feb. 20, 1990

[54] METHOD FOR SURFACE TREATMENT OF CARBON FIBERS FOR REINFORCEMENT

[75] Inventors: Takashi Yamada; Ryusuke Hayashi; Yoshio Nakazawa, all of Kawasaki, Japan

[73] Assignees: Nippon Steel Corporation; Nippon Steel Chemical Co. Ltd., both of Tokyo, Japan

[21] Appl. No.: 232,648

[22] Filed: Aug. 16, 1988

[51] Int. Cl.$^4$ .............................................. B05D 3/02
[52] U.S. Cl. ................................. 427/386; 428/408; 428/413
[58] Field of Search ................. 427/386; 428/408, 413

[56] References Cited

U.S. PATENT DOCUMENTS 4,517,245  5/1985  Spain ..................................... 428/367
4,555,446  11/1985  Sumida et al. ....................... 428/367

Primary Examiner—Michael Lusignan
Assistant Examiner—Nicholas Krisch
Attorney, Agent, or Firm—Wenderoth, Lind & Ponack

[57] ABSTRACT

A method for treatment of carbon fibers for reinforcement comprises the step of coating or impregnating carbon fibers with an emulsion of epoxy resin having colloidal silica added thereto so as to harden the same. The carbon fibers treated in this way exhibit high bonding strength with respect to a concrete matrix, making it possible to obtain excellent carbon fiber reinforced mortar and concrete.

4 Claims, No Drawings

METHOD FOR SURFACE TREATMENT OF CARBON FIBERS FOR REINFORCEMENT

BACKGROUND OF THE INVENTION

1. Field of the Invention

The present invention relates to a method for surface treatment of carbon fibers for reinforcing mortar or concrete.

2. Description of the Prior Art

Carbon fibers are easily available and are excellent in such mechanical characteristics as specific strength, inelastic ratio and chemical resistant. They have thus enjoyed extensive use. However, they are seldom employed as they are but are generally used as a reinforcing material.

Mortar or concrete reinforced with carbon fibers is mainly employed in roofs, walls, floors, etc. in the fields of civil and architectural engineering. Thus improvement of the bonding strength between the carbon fibers and cement is highly desired.

Hitherto, attempts have been made to mix cement system composite materials with carbon fibers and various improved characteristics have been reported in this connection by, for example, in M. A. Ali, A. J. Majumdar and D. L. Rayment "Carbon-fiber Reinforcement of Cement" (Cement and Concrete Research, vol. 2, pp 201–212, 1972), Akihama (Annual Report of Kajima Construction Technology Institute, vol. 29, 1981), and others.

Various modifications have been made with respect to the form, shape, etc. of carbon fibers, but carbon fibers without sizing or as treated with epoxy resin etc. have generally been employed.

However, in such cases the bonding strength between the carbon fibers and the cement matrix is low and accordingly is not sufficient to ensure the reliability of the mortar or concrete reinforced thereby. Thus the full strength of the carbon fibers has not been fully utilized.

Since carbon fibers have poor bonding property with respect to a cement matrix, it has been impossible to make full use of the strength of carbon fibers in mortar or concrete reinforced thereby. For this reason, various methods for surface treatment of carbon fibers have been studied.

However, when carbon fibers which have not been sized or whose surface has been oxidized are employed as a reinforcing material, the cement matrix does not permeate into the carbon fiber strand and only the carbon fibers on the outside of the strand make contact with the cement matrix. As a result, the bonding between the carbon fiber strand and the cement matrix is poor.

Furthermore, while sizing carbon fibers using colloidal silica ($SiO_2$) may improve the wettability of the carbon fibers with respect to the cement matrix, the cement matrix does not permeate into the strand so that bonding between the carbon fibers and the cement matrix is not improved.

Still further, while the method of bundling carbon fibers with epoxy resin may help to transmit stress to the filaments constituting the strand, the bonding strength between the epoxy resin and cement matrix nevertheless remains poor.

In addition, it has been pointed out that since carbon fibers have high strength and high elasticity but do not exhibit an appreciable yield characteristic, there exists a danger of breakage due to sudden fracture of the carbon fibers.

SUMMARY OF THE INVENTION

An object of the present invention is to provide a surface treatment method for carbon fibers which improves the bonding strength of the carbon fiber with cement matrix and thus enables production of highly reliable carbon fiber reinforced mortar or concrete.

DETAILED DESCRIPTION OF THE INVENTION

The method for surface treatment of carbon fibers according to the present invention comprises the steps of preparing an emulsion by blending colloidal silica with epoxy resin emulsion in a ratio of 1–30 wt. % of $SiO_2$, to the combined weight of the resin and the $SiO_2$, and sizing carbon fibers or carbon fiber strands with said emulsion.

More specifically, a self-emulsifying type epoxy resin hardening agent which undergoes a low degree of argillation by dilution with water is thoroughly mixed with an epoxy resin, the mixture is added with a prescribed amount of a colloidal solution (colloidal silica) of high molecular weight anhydride silicate obtained by mono-dispersing 1–100 m$\mu$m particles of silica ($SiO_2$) in water and a prescribed amount of water, and thoroughly stirring the mixture to obtained a stable emulsion. The amount of colloidal silica used is selected such that the hardening of said epoxy resin will not be inadequate and is preferably such that the weight of $SiO_2$ to that of the total said resin emulsion and $SiO_2$ becomes 1–30 weight %.

Carbon fibers or carbon fiber strands are coated or impregnated with the emulsion so as to harden the same.

As a result, the wettability and bonding strength of the epoxy resin with respect to the cement matrix is improved, whereby there is obtained carbon fiber reinforced mortar or concrete which fully utilizes the strength of the carbon fibers.

Furthermore, by varying the average grain diameter of the $SiO_2$ contained in the colloidal silica, it becomes possible to vary the bonding strength of the epoxy resin. Thus, this bonding strength can be adjusted according to the strength of the carbon fibers and the amount thereof used so that bonding break will occur prior to severance of the carbon fibers and slippage will arise between the carbon fibers and the matrix of the concrete reinforced thereby. In fact, when mortar and concrete according to the invention were subjected to a bending test, it was found that this slippage resulted in a pseudo yield condition when the average grain size of $SiO_2$ in the colloidal silica was within the range of 1–100 m$\mu$m (10–1000 Å).

From the points of handing ease and preservability, it is preferable to use a two-liquid emulsion epoxy resin. In particular, there can be used Epicoat 828 and 834 manufactured by Yuka Shell-Epoxy K.K. As the hardening agent there can be used SE-10 and SE-11 manufactured by the same company. Usable as colloidal silica are, for example, Cataloid SI-30, SI-350, SC-30 and SI-45P manufactured by Catalysts & Chemicals Ind. Co., Ltd.

There is no restriction on the carbon fiber used as regards its raw material, process of production, strand length, number of filaments or whether it is in the form of strands or cloth. However, when the carbon fibers have been surface treated beforehand with a resin etc.

having no epoxy base, the method of the present invention will provide better effect if the resin coating is removed before use.

In accordance with this invention, the wettability and bonding strength of carbon fibers with respect to a cement matrix is enhanced by bundling the carbon fibers or continuous strands thereof with a blended emulsion of epoxy resin and colloidal silica ($SiO_2$), whereby it is possible to provide highly reliable carbon fiber reinforced mortar and concrete.

Embodiments of the present invention will now be set out in detail. The present invention, however, is not limited only to said embodiments.

EXAMPLE 1

Epoxy resin (mixed type consisting of a base of Epikote 828 and a hardening agent of SE-11, both manufactured by Yuka Shell-Epoxy) and colloidal silica (SI-30; grain size 10–14 m$\mu$m; $SiO_2$ 30 wt. %; manufactured by Catalysts & Chemicals) were blended and diluted with water so as to obtain an epoxy resin emulsion comprising 5 wt. % $SiO_2$, the composition ratio being as follows:

| | |
|---|---|
| Epikote 828 | 100 parts by weight |
| SE—11 | 60 parts by weight |
| SI—30 | 83.5 parts by weight (comprising 25 parts by weight of $SiO_2$) |
| Water | 256.5 parts by weight |

The epoxy resin emulsion was used to size a carbon fiber strand (12,000 filaments of a diameter of 7 $\mu$m; tensile strength 280 kg/mm$^2$; manufactured by Hysol Grafil Ltd., England).

The bonding strength of the bundled carbon fiber strand and a cement matrix (Portland cement (C); fine aggregate: No. 8 quartz sand (S); water (W); S/C=0.5; W/C==0.5) was measured in accordance with the Method of Test for Bond of Fibers stipulated by the Japan Concrete Institute.

Namely, four fibers were set in four holes of a partitioning board and the partitioning board was placed in a mould, into which cement was poured to obtain a briquetted specimen with the partitioning board positioned at the center of the specimen, namely at the section of minimum area thereof. A tensile load was applied to the center portion of the specimen at a loading rate of 0.8 mm/min and the load-slippage curve was continuously determined.

EXAMPLE 2

Epoxy resin (mixed type consisting of a base of Epikote 828 and a hardening agent of SE-11, both manufactured by Yuka Shell-Epoxy) and colloidal silica (SI-30; grain size 10–14 m$\mu$m; $SiO_2$ 30 wt. %; manufactured by Catalysts & Chemicals) were blended and diluted with water so as to obtain an epoxy resin emulsion comprising 10 wt. % $SiO_2$, the composition ratio being as follows:

| | |
|---|---|
| Epikote 828 | 100 parts by weight |
| SE—11 | 60 parts by weight |
| SI—30 | 166.5 parts by weight (comprising 50 parts by weight of $SiO_2$) |
| Water | 173.5 parts by weight |

The same type of carbon fiber strand as that of Example 1 was sized with the emulsion. The bonding strength of the bundled carbon fiber strand with the same type of cement matrix as that of Example 1 was measured.

EXAMPLE 3

Epoxy resin (mixed type consisting of a base of Epikote 828 and a hardening agent of SE-11, both manufactured by Yuka Shell-Epoxy) and colloidal silica (SI 30; grain size 10–14 m$\mu$m; $SiO_2$ 30 wt. %; manufactured by Catalysts & Chemicals) were blended and diluted with water so as to obtain an epoxy resin emulsion comprising 15 wt. % $SiO_2$, the composition ratio being as follows:

| | |
|---|---|
| Epikote 828 | 100 parts by weight |
| SE—11 | 60 parts by weight |
| SI—30 | 250 parts by weight (comprising 75 parts by weight of $SiO_2$) |
| Water | 90 parts by weight |

The same type of carbon fiber strand as that of Example 1 was sized with the emulsion. The bonding strength of the bundled carbon fiber strand with the same type of cement matrix as that of Example 1 was measured.

EXAMPLE 4

Epoxy resin (mixed type consisting of a base of Epikote 828 and a hardening agent of SE-11, both manufactured by Yuka Shell-Epoxy) and colloidal silica (SI-45P; grain size 35–55 m$\mu$m; $SiO_2$ 40 wt. %; manufactured by Catalysts & Chemicals) were blended and diluted with water so as to obtain an epoxy resin emulsion comprising 15 wt. % $SiO_2$, the composition ratio being as follows:

| | |
|---|---|
| Epikote 828 | 100 parts by weight |
| SE—11 | 60 parts by weight |
| SI—30 | 187.5 parts by weight (comprising 75 parts by weight of $SiO_2$) |
| Water | 152.5 parts by weight |

The same type of carbon fiber strand as that of Example 1 was sized with the emulsion. The bonding strength of the bundled carbon fiber strand with the same type of cement matrix as that of Example 1 was measured.

EXAMPLE 5

Epoxy resin (mixed type consisting of a base of Epikote 828 and a hardening agent of SE-11, both manufactured by Yuka Shell-Epoxy) and colloidal silica (SI-80P; grain size 70–90 m$\mu$m; $SiO_2$ 40 wt. %; manufactured by Catalysts & Chemicals) were blended and diluted with water so as to obtain an epoxy resin emulsion comprising 15 wt. % $SiO_2$, the composition ratio being as follows:

| | |
|---|---|
| Epikote 828 | 100 parts by weight |
| SE—11 | 60 parts by weight |
| SI—45P | 187.5 parts by weight (comprising 75 parts by weight of $SiO_2$) |
| Water | 152.5 parts by weight |

The same type of carbon fiber strand as that of Example 1 was sized with the emulsion. The bonding strength of the bundled carbon fiber strand with the same type of cement matrix as that of Example 1 was measured.

Comparison 1

A carbon fiber strand (same type as that of Example 1) which had not been sized was measured for bonding strength with respect to a cement matrix (same type as that of Example 1).

Comparison 2

A carbon fiber strand of the same type as that of Example 1 but sized with colloidal silica (SI-30 and SI-350 manufactured by Catalysts & Chemicals) containing 30 wt. % of $SiO_2$ was measured for bonding strength with respect to a cement matrix the same as that of Example 1.

Comparison 3

A same carbon fiber strand of the same type as that of Example 1 but sized with epoxy resin to a coating weight of 35–50% was measured for bonding strength with respect to a cement matrix of the same type as that of Example 1.

TABLE 1

|  | Maximum load (kg f) |
|---|---|
| Example 1 | 11.5 |
| Example 2 | 12.7 |
| Example 3 | 16.7 |
| Example 4 | 15.2 |
| Example 5 | 12.5 |
| Comparison 1 | 2.8 |
| Comparison 2 | 2.6 |
| Comparison 3 | 6.3 |

The test was carried out to determine the bonding strength per 10 mm of the carbon fiber strand.

As is obvious from Table 1, the bonding strength varies with change in the blend ratio of the colloidal silica and the grain diameter of the $SiO_2$.

What is claimed is:

1. A method for surface treatment of carbon fibers for reinforcement comprising the step of coating or impregnating carbon fibers or carbon fiber strands with an emulsion of epoxy resin having an effective amount of colloidal silica added thereto so as to harden the same.

2. The method claimed in claim 1, wherein the average grain size of the $SiO_2$ in said colloidal silica is 1–100 m$\mu$m.

3. The method claimed in claim 1, wherein the content of said $SiO_2$ in said epoxy resin emulsion, added with colloidal silica is 1–30 wt. %.

4. The method claimed in claim 1, wherein said epoxy resin is a mixed type emulsion.

* * * * *